E. H. ASHCROFT

Assignor to J. DENSMORE.

Railroad-Car Heater.

No. 7,967. Reissued Nov. 27, 1877

Witnesses
H. R. Edelen
D. P. Cowl

Inventor
Edward H. Ashcroft,
By James Densmore, Attorney 7,967. RAILROAD-CAR HEATERS. Edwd. H. Ashcroft, Lynn, Mass., assignor to Jas. Densmore, Meadville, Pa. Patent No. 54,662, dated May 15, 1866; Reissue No. 2,917, dated Apr. 14, 1868; Reissue No. 6,652, dated Sept. 21, 1875. Filed Nov. 22, 1877.

*To all whom it may concern:*

Be it known that I, EDWARD H. ASHCROFT, of Lynn, county of Essex, and State of Massachusetts, have invented an Improvement in Heating Railway-Cars, which is fully described in the following specification and represented in the accompanying drawing, of which—

Figure 1:
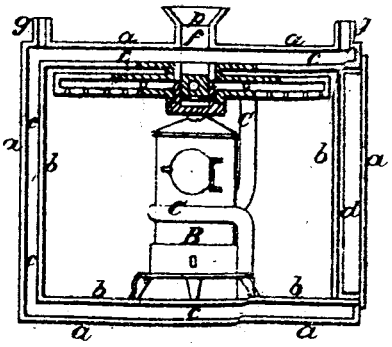
Figure 2:
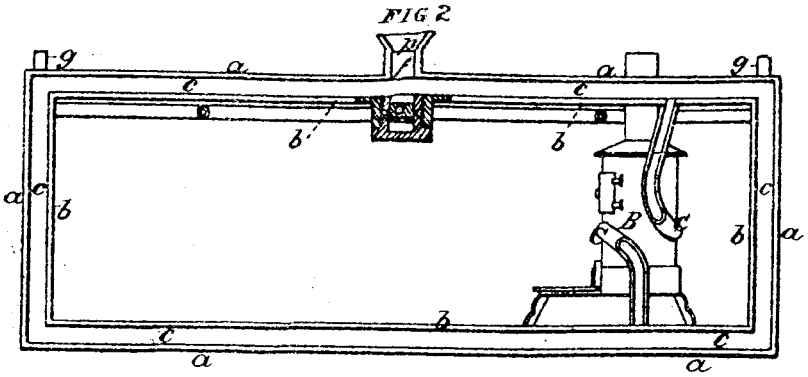
Figure 3:
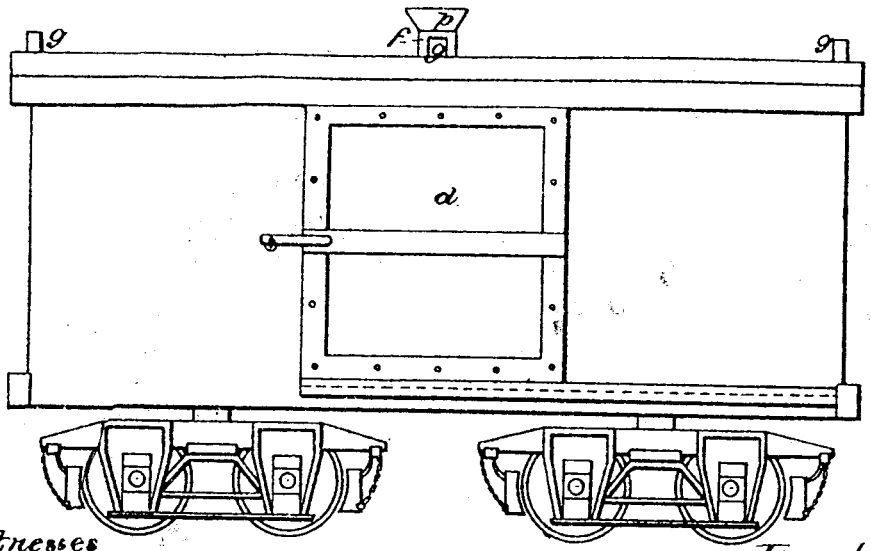

Figure 1 represents a side view, Fig. 2 a longitudinal sectional view, and Fig. 3 a transverse sectional view, of a railway-car made in accordance with my invention.

In carrying out my invention, I surround the interior chamber of the car with a space for holding water, arranged underneath the bottom, over the top, and against the sides and ends, excepting where it may be necessary to have doorways and window-openings. Furthermore, I arrange on the car, or outside of it, or in a chamber or suitable space situated either within or without the car, and so as to move with it, a stove or heating apparatus, and I apply to or combine with such stove and the water-space a pipe to open at one extremity into the upper part of the water-space, and at the other into the lower part of such space, in order that there may be a free flowage of water through the pipe, and that such water, while flowing through the said pipe, may be heated by heat from the heating apparatus. By such means I am enabled to heat the fluid in the water-space. and to cause heat to circulate through it, and thus warm the chamber of the car.

In the drawing, *a* represents a casing, which surrounds the interior of the car, except the door and window openings; *b*, a like casing within the outer casing *a*; *c*, a water-holding space at the bottom, ends, sides, and top, between the casings *a b*; *f*, an induction-pipe, connected with the outer casing *a* at the top, and extended up through the roof of the car; *p*, a tunnel-shaped mouth on the upper end of the induction-pipe *f*; *g*, one or more eduction or steam or water escape pipe or pipes, connected with the outer casing *a* at the top, and extended up through the roof of the car; B, a stove or heater within the car, and C a pipe connected with the inner casing *b* at the bottom, and extended to and coiled around the heater B, and thence extended up to and connected with the inner casing *b* at the bottom. The casings *a b* are attached together, and, with the space or spaces *c* between them at the bottom, ends, sides, and top, form a general receptacle, or series of receptacles, for holding water. The inner pipe C extends through the inner casing *b* at both extremities, and opens into both the upper and lower parts or chambers of the water-holding space *c*, or general receptacle *a b*; and both the induction and eduction pipes *f g* extend through the outer casing *a*, and open into the upper part or chamber of said space *c* or receptacle *a b*.

To operate the invention, pour water into the mouth *p* of the induction-pipe *f* till the inner pipe C and the bottom, end, and side parts or chambers of the water-holding space *c* are filled, and the upper part or chamber of the water-space *c* is nearly filled, leaving only room for the expansion of the water when heated. Then make a fire in the heater B. This will heat the coil of the inner pipe C, and the water therein. The water, when heated, will expand and become lighter and rise, and cooler water will take the place at the heating-point. In rising the heated water will radiate and give out its heat through the surfaces of the inner pipe C and casings *a b*, till it in turn will become cooler and sink, and newly-heated water take the place at the top. In this way a circulation will be established, the heated water rising through the inner pipe C, which thus becomes a conducting or circulating pipe, and the cooled water sinking through the end and side parts or chambers of the water-space *c* or receptacle *a b*, and the circulation will continue while fire is maintained in the heater B, the cooled water receiving heat from the heater B through the coil of the circulating or conducting pipe C, and the heated water giving out that heat through the radiating-surfaces of said conducting-pipe C and the water-space casings *a b*.

It is necessary in winter to keep an express-car warm in order that the guard or man in charge may be able to remain in it while *en route;* and it is for this reason that I combine with the water-space about the chamber of the car a heating apparatus and circulating-pipe.

This is a division of my original invention of a combined heating and safety apparatus for express-carriages for railways and common roads; and the nature of this part of the invention is in combining with a railway-car a hot-water-circulating and heat-radiating apparatus; in combining with a railway-car a heater, an elevated water-receptacle, and a rising pipe connected with the heater and water-receptacle; in combining with a railway-car a heater, a heating-coil, a rising pipe, which opens into the heating-coil, and an elevated water-receptacle, and a descending pipe, which opens into the heating-coil, and a depressed water-receptacle, which depressed and elevated water-receptacles are connected otherwise than through the heating-coil; and in combining with a railway-car a heater, a water-receptacle, circulating currents of warm or hot water, and the radiating-surfaces of the conducting-pipe or water-receptacle. Therefore,

What I claim is as follows:

1. The combination of a hot-water-circulating and heat-radiating apparatus with a railway-car, substantially as described.

2. The combination, with a railway-car, of a heater, an elevated water-receptacle, and a rising pipe connected with the heater and water-receptacle, substantially as described.

3. The combination, with a railway-car, of a heater, a heating-coil, an elevated and a depressed water-receptacle, a rising pipe, which opens into the heating-coil and elevated water-receptacle, and a descending pipe, which opens into the heating-coil and depressed water-receptacle, and which depressed and elevated water-receptacles are connected otherwise than through the heating-coil, substantially as described.

4. The combination of a heater, a water-receptacle, circulating currents of warm or hot water, and the radiating-surfaces of the conducting-pipe or water-receptacle, with a railway-car, substantially as described.

EDWARD H. ASHCROFT.

Witnesses:

M. LUSCOMB,

F. T. TALEY.